Figure 1:
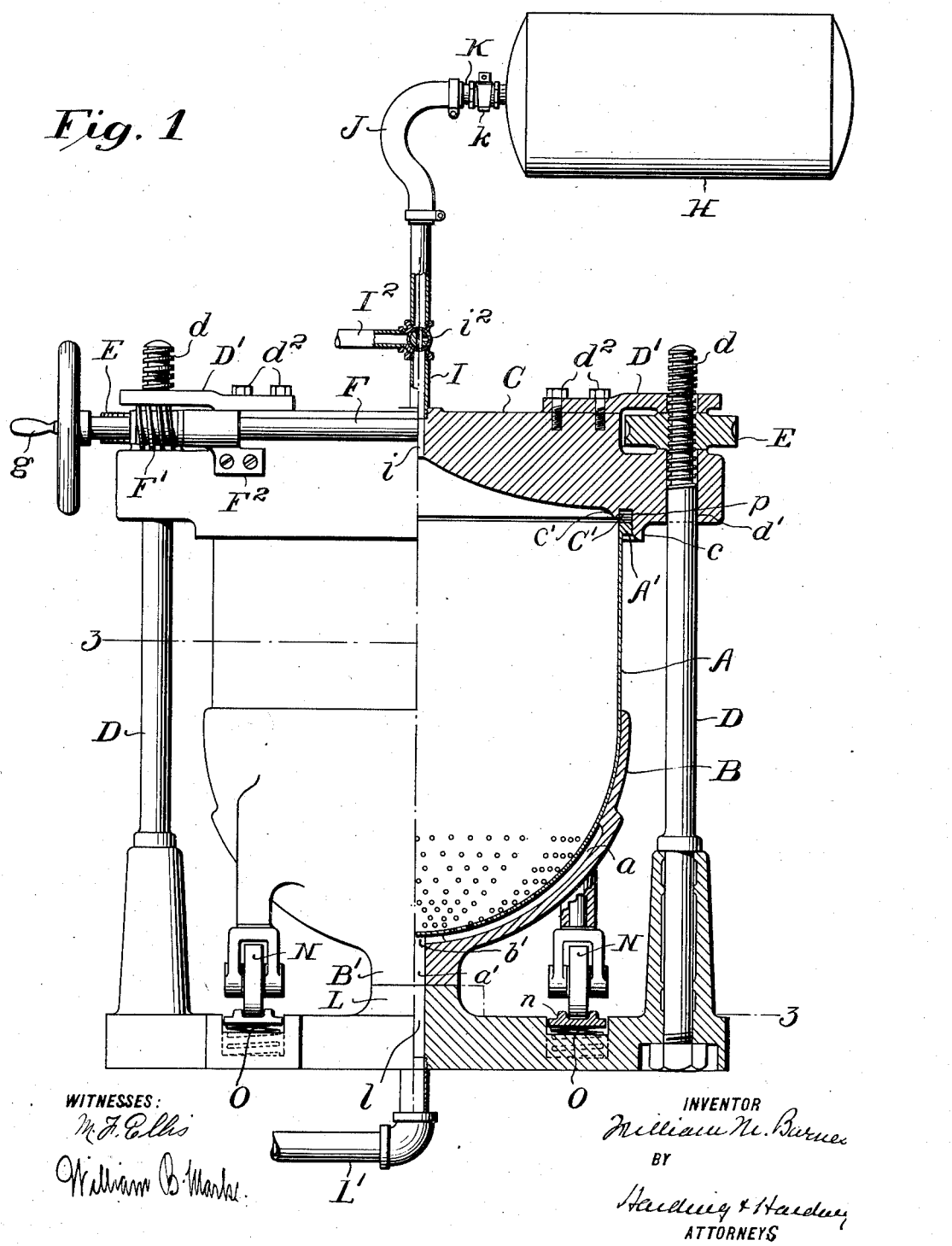

No. 846,447. PATENTED MAR. 12, 1907.
W. M. BARNES.
APPARATUS FOR THE EXTRACTION OF LIQUIDS FROM SOLID MATERIALS.
APPLICATION FILED MAY 13, 1904.

2 SHEETS—SHEET 1.

WITNESSES:
INVENTOR
William M. Barnes
BY
Harding & Harding
ATTORNEYS

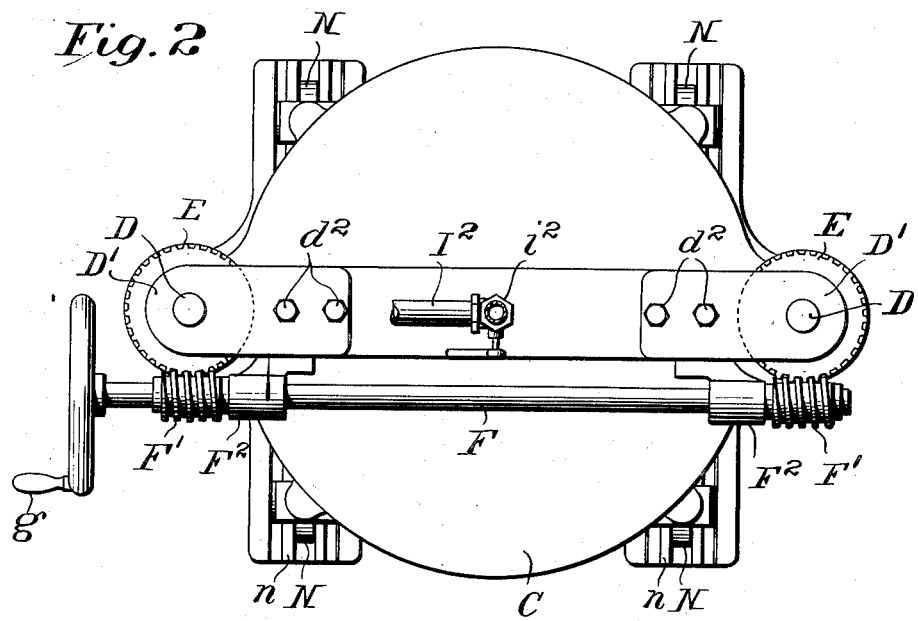
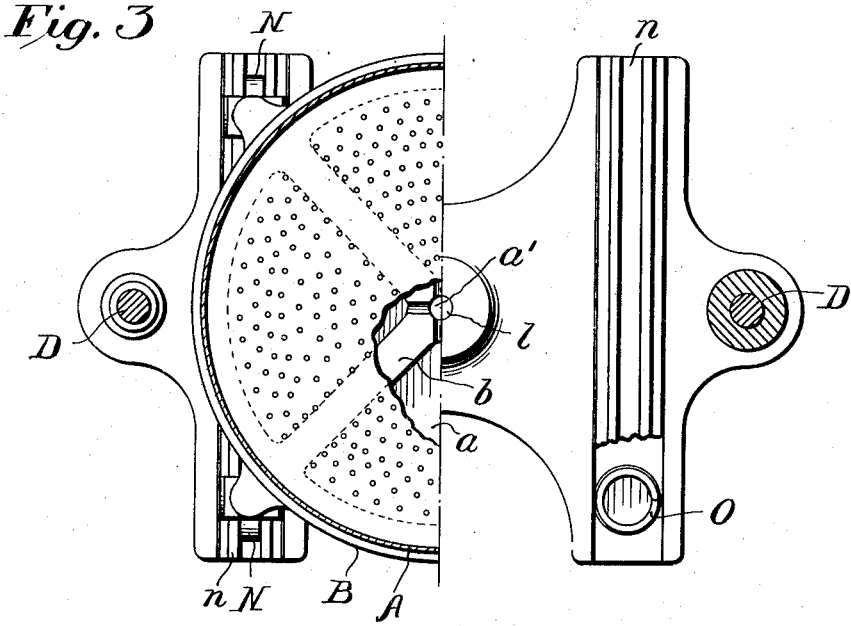

UNITED STATES PATENT OFFICE.

WILLIAM M. BARNES, OF PHILADELPHIA, PENNSYLVANIA.

APPARATUS FOR THE EXTRACTION OF LIQUIDS FROM SOLID MATERIALS.

No. 846,447.  Specification of Letters Patent.  Patented March 12, 1907.

Application filed May 13, 1904. Serial No. 207,784.

*To all whom it may concern:*

Be it known that I, WILLIAM M. BARNES, a citizen of the United States, residing at Philadelphia, county of Philadelphia, and State of Pennsylvania, have invented a new and useful Improvement in Apparatus for the Extraction of Liquids from Solid Materials, of which the following is a full, clear, and exact description, reference being had to the accompanying drawings, which form a part of this specification.

My invention has for its object a new apparatus for the extraction of liquids from solid material, which is particularly adapted for laundry-work. In the machine now in general use—for instance, in laundry-work—the goods or material from which the water is to be extracted are placed in a basket or perforated vessel, which is rapidly rotated, and by the action of centrifugal force the liquid is forced out through the perforations, while the solid material remains in the vessel deprived of a large percentage of its moisture. In many cases this machine had many disadvantages. It is quite slow, requiring a considerable period to get up speed and to come to rest. Again, it is quite difficult i not impossible to load the vessel evenly, and consequently it, when loaded, is normal y out of balance, requiring extraneous means to compensate for this condition. It also requires repeated hand ing of the goods to take them from the washing-machine and place them in the extractor and to remove them.

Speaking generally, in my invention I place the material from which the liquid is to be extracted, say, washed material, in a closed vessel, a portion of the walls of which are perforated The clothes are placed in the vessel, filling the vessel above the line of perforations. The vessel is provided with a cover which is supported independent of the vessel, and the vessel can be moved to and from alinement with the cover When it is brought nto alinement with the cover, it ( he cover) is forced down upon the vessel into air-tight connection. Air is then admitted under pressure to the vessel, above the material, which tends to force the material against the walls of the vessel, and the material acting, as it were, like a piston under the great pressure forces the liquid out through the perforations. The water in the material prevents the air passing through. The vessel of course is made air-tight or sealed, so that beyond the inlet-pipe and the perforations the vessel is closed. The goods may be loaded directly from the washing-machines into the vessel. The vessel is then moved into alinement with cover, and the cover forced into air-tight connection therewith and air is admitted as described. When the liquid is extracted, the cover is released and the vessel with the goods therein moved to the desired point. My invention also relates to certain details of construction.

I will now describe the machine illustrated in the accompanying drawings for carrying out my invention and then point out the invention in the claims.

In the drawings, Figure 1 is an elevation partly in section. Fig. 2 is a plan view. Fig. 3 is a section on line 3 3, Fig. 1.

A is the vessel, having the outer or double lower portion B, between which and the main vessel A is the space $a$. Projecting from the outer portion B and into the space $a$ are the ribs $b$, channels being formed in the space $a$ between ribs $b$. These channels lead to the low point $b'$ of the outer portion B, from which a boss $B'$ projects, through which and opening into space $a$ is the passage $a'$. The lower portion of the vessel A contacts with the ribs $b$ and is perforated a distance from its lower end, as shown in the drawings, the perforations opening into space $a$. The top of the vessel A is open and has a flange $A'$ extending around it.

C is the cover, having the projecting flange $c$ around it and the annular recess $C'$.

D are standards having the threaded upper ends $d$, on which work the internally-threaded worm-wheels E. These standards pass through orifices $d'$ in the cover and through the orificed brackets $D'$, secured to the top of cover by bolts $d^2$, said orifices serving as guides for the standards.

F is a worm-shaft having near each end the worms $F'$, meshing with the respective worm-wheels E. This shaft is carried by the brackets $b^2$. Secured to one end of the shaft F is a wheel having the crank $g$. When the vessel A is in the position shown in Fig. 1, the shaft has been turned, so that the cover C is moved down on the top of vessel A, the flange $c$ lapping the flange $A'$ on the vessel A, and the rubber or elastic packing $p$, held in the annular recess $C'$, presses down on the flange $A'$, so that an air-tight joint is obtained. The packing $p$ projects below the flange $c'$.

H is a reservoir for compressed air at high pressure. Through the cover is an orifice $i$, into which enters and above which projects the pipe I, having the three-way valve $i^2$ and the branch pipe $I^2$ at that point.

J is a flexible pipe connecting the upper end of pipe I and the pipe K, having cock $k$, extending from the reservoir H.

L is a pedestal on which the boss B' rests when the vessel is in the position shown in Fig. 1. Through this pedestal an orifice $l$ passes, connecting with pipe L' to a discharge-sewer or the ground.

When the parts are in the position shown in Fig. 1, with the cover on the vessel making an air-tight fit, the cock $k$ is opened and the valve $i^2$ turned to connect the pipe I with the vessel. The air under pressure will then pass into the interior of vessel A, exerting a great pressure upon the material in the vessel, which will be compressed downward against the perforated walls, forcing the liquid out through the perforations. From thence it will pass by the passages between the vessel A, outer portion B, to the outlet described. The entering air will also by pressing against the packing $p$ itself assist in maintaining the joint air-tight. When the material has been substantially deprived of its moisture, the cock $k$ is closed, the valve $i^2$ operated to connect pipe I with pipe $I^2$, and the pressure in the vessel relieved. Then by operating the crank $g$ the cover may be elevated and the vessel top opened.

My improved apparatus facilitates the operation of extracting liquids, for I may, as shown, mount the vessel A upon wheels N, by which the vessel may be run from the place of reception of material to the point where the pneumatic extractor is placed. The material may be taken from its place of previous treatment and directly placed in the vessel A, which is moved on the track to a point under the cover C. In order to allow the boss B' to be over the pedestal L and not strike it at that point while reaching its proper position, I support the vessel upon tracks $n$, which are upon yielding supports, shown as springs O, the resistance of which is greater than the weight of the vessel A and its contents. When the springs are extended, the tracks $n$ are elevated sufficiently to allow the boss B' to pass to position over the pedestal without striking it. When the cover is pressed down, the springs yield sufficiently to allow the boss to contact with the pedestal, as shown in Fig. 1.

Having now fully described my invention, what I claim, and desire to protect by Letters Patent, is—

1. In a machine of the character described, in combination, a vessel having an inner and an outer wall at one portion thereof, there being a space between said walls, ribs between the inner and outer walls forming passages, there being perforations in the inner wall opening into the space between the walls and an outlet from said space toward which said passages converge.

2. In a machine of the character described, in combination, a vessel having an inner and outer wall at one portion thereof, there being a space between said walls, ribs between the inner and outer walls, there being perforations in the inner wall opening into the space between the walls and an outlet from said space, a fixed pedestal having an outlet adapted to coincide with the orifice in the vessel, wheels upon which said vessel is carried, tracks upon which said wheels run, and yielding supports for said tracks contiguous to said pedestal.

3. In a machine of the character described, in combination, a vessel having perforations in its walls, an open end, a cover, means to force said cover into air-tight connection with the open end of said vessel, an air-pressure reservoir, a pipe, there being an orifice in said cover with which said pipe connects, a connection between said pipe and the air-reservoir, an exhaust-pipe, connecting with the pipe last mentioned, and a valve adapted to connect the first-mentioned pipe with either the pressure-reservoir or exhaust-pipe.

4. In a machine of the character described, in combination, a vessel having an open end, a laterally-projecting flange at its open end, a cover, having a vertical projection, adapted to contact with said flange, and a portion adapted to overlie said flange and an elastic packing interposed between said flange and overlying portion of cover.

5. In a machine of the character described, in combination, a vessel, there being an outlet from said vessel, a cover supported independently of said vessel, said vessel having a movement relative to said cover and means, when said vessel is in alinement with said cover, to force the cover into air-tight connection with the vessel.

6. In a machine of the character described, in combination, a vessel, there being an outlet from said vessel, a cover supported independently of said vessel, said vessel having a movement relative to said cover and means, when said vessel is in alinement with said cover, to force the cover into air-tight connection with the vessel, a source of air-pressure, and connection between said source of pressure and the interior of the cover.

7. In a machine of the character described, in combination, a vessel, there being an outlet from said vessel, a cover supported independently of said vessel, said vessel having a movement relative to said cover and means, when said vessel is in alinement with said cover, to force the cover into air-tight connection with the vessel, and an outlet in vertical alinement with the cover adapted to register with the vessel-outlet.

8. In a machine of the character described, in combination, a vessel, there being an outlet from said vessel, a cover supported independently of the said vessel, said vessel having a movement relative to said cover and means, when said vessel is in alinement with said cover, to force the cover into air-tight connection with the vessel, an outlet in vertical alinement with the cover adapted to register with the vessel-outlet, a source of air-pressure, and connection between said source of pressure and the interior of the cover.

9. In a machine of the character described, in combination, a vessel, there being an outlet from said vessel, a cover supported independently of said vessel, said vessel having a movement relative to said cover and means, when said vessel is in alinement with said cover, to force the cover into air-tight connection with the vessel, and a fixed outlet in vertical alinement with the cover adapted to register with the vessel-outlet, and a yielding support for the vessel when said vessel is in said alinement.

10. In a machine of the character described, in combination, a vessel, there being an outlet from said vessel, a cover supported independently of said vessel, said vessel having a movement relative to said cover and means, when said vessel is in alinement with said cover, to force the cover into air-tight connection with the vessel, a fixed outlet in vertical alinement with the cover adapted to register with the vessel-outlet, and a yielding support for the vessel when said vessel is in said alinement, a source of air-pressure and connection between said source of pressure and the interior of the cover.

11. In a machine of the character described, in combination, a track, a vessel supported so as to travel on said track, a cover supported independently of said vessel in line of travel of said vessel, and means to force said cover into air-tight connection with said vessel.

12. In a machine of the character described, in combination, a track, a vessel supported so as to travel on said track, a cover supported independently of said vessel in line of travel of said vessel, and means to force said cover into air-tight connection with said vessel, a source of air-pressure, and connection between said source of pressure and the interior of the cover.

13. In a machine of the character described, in combination, a track, a vessel, having an outlet supported so as to travel on said track, a cover supported independently of said vessel in line of travel of said vessel, an outlet in vertical alinement with said cover, and adapted to register with the vessel-outlet when the vessel is in alinement with the cover, means to force the cover into air-tight connection with the vessel.

14. In a machine of the character described, in combination, a track, a vessel, having an outlet supported so as to travel on said track, a cover supported independently of said vessel in line of travel of said vessel, an outlet in vertical alinement with said cover, and adapted to register with the vessel-outlet when the vessel is in alinement with the cover, means to force the cover into air-tight connection with the vessel, a source of air-pressure, and connection between said source of pressure and the interior of the cover.

15. In a machine of the character described, in combination, a track, a vessel, having an outlet supported so as to travel on said track, a cover supported independently of said vessel, in line of travel of said vessel, a fixed outlet in vertical alinement with said cover and adapted to register with the vessel-outlet when the vessel is in alinement with the cover, means to force the cover into air-tight connection with the vessel, the track adjacent to the fixed outlet being yieldingly supported.

16. In a machine of the character described, in combination, a track, a vessel, having an outlet supported so as to travel on said track, a cover supported independently of said vessel, in line of travel of said vessel, a fixed outlet in vertical alinement with said cover and adapted to register with the vessel-outlet when the vessel is in alinement with the cover, means to force the cover into air-tight connection with the vessel, the track adjacent to the fixed outlet being yieldingly supported, a source of air-pressure and connection between said source of pressure and the interior of the cover.

17. In a machine of the character described, in combination, a vessel, there being an outlet from said vessel, a cover for said vessel and a yielding support for said vessel in alinement with said cover.

In testimony of which invention I have hereunto set my hand, at Philadelphia, on this 10th day of May, 1904.

WILLIAM M. BARNES.

Witnesses:
M. M. HAMILTON,
WILLIAM B. MARKS.